Dec. 26, 1967 W. R. HEIN 3,359,694
DOMICAL BUILDING STRUCTURE
Filed Aug. 16, 1965 5 Sheets-Sheet 1

WALTER R. HEIN
INVENTOR.

BY *Seed & Berry*

ATTORNEYS

Dec. 26, 1967  W. R. HEIN  3,359,694

DOMICAL BUILDING STRUCTURE

Filed Aug. 16, 1965  5 Sheets-Sheet 2

WALTER R. HEIN
INVENTOR.

BY *Seed & Berry*

ATTORNEYS

Dec. 26, 1967   W. R. HEIN   3,359,694
DOMICAL BUILDING STRUCTURE
Filed Aug. 16, 1965   5 Sheets-Sheet 3

WALTER R. HEIN
INVENTOR.

BY *Seed & Berry*

ATTORNEYS

Dec. 26, 1967 W. R. HEIN 3,359,694
DOMICAL BUILDING STRUCTURE
Filed Aug. 16, 1965 5 Sheets-Sheet 4

WALTER R. HEIN
INVENTOR.

BY
ATTORNEYS

Dec. 26, 1967 W. R. HEIN 3,359,694
DOMICAL BUILDING STRUCTURE
Filed Aug. 16, 1965 5 Sheets-Sheet 5

WALTER R. HEIN
INVENTOR.

BY *Seed & Berry*

ATTORNEYS

United States Patent Office 3,359,694
Patented Dec. 26, 1967

3,359,694
DOMICAL BUILDING STRUCTURE
Walter R. Hein, 25433 Benson Road,
Kent, Wash. 98031
Filed Aug. 16, 1965, Ser. No. 479,852
7 Claims. (Cl. 52—81)

The present invention relates generally to domical building structures in which the structural elements interconnect at the vertices of predetermined polyhedral angles which are arranged on the dome in a symmetrical pattern.

More specifically, the invention departs from a geodesic pattern such for example as shown in Patent No. 2,682,235, and instead, aims to provide an arrangement in which the polyhedral vertices are located in generally azimuthal rows with substantially at least the bottom half of the rows being truly azimuthal.

Further objects are to provide such a domical structure in which the number of different structural elements is minimized for economy of construction and in which the elements may be precision fabricated.

The invention also aims to provide such a domical structure in which the pattern of structural elements can be made pleasing to the eye and can be varied substantially at will within the teachings of the invention.

Still another object is to provide such a domical structure permitting substantially maximum use of the ground floor area.

Other more particular objects and advantages of the invention will, with the foregoing, appear and be understood in the course of the following description and claims.

Before referring specifically to structures embodying the present invention a general explanation will be given as to the structural geometry. First a pattern of vertices is established on an imaginary spheroid with the pattern being bisected at the equator. About half the vertices are located in the 90° of latitude centered on the equator of the spheroid and these central vertices are arranged in azimuthal rows with the same number of vertices in each row. Above and below this equatorial 90° zone there is a respective row of vertices which has less vertices than the rows in such zone and which may zig-zag relative to an azimuth. Then the rows preferably are azimuthal again and gradually decrease in number of vertices until the apex and nadir are reached or approached depending, respectively, on whether the top and bottom of the spheroid are such a vertex or a polygon. If there is an odd number of rows the middle row will always be on the equator; if even, the equator will be midway between two rows.

The ultimate dome becomes approximately half of the imaginary spheroid. To give maximum headroom at the floor level I prefer that the base of the dome be selected at the equator at the first row of vertices below the equator, or therebetween.

Polyhedral angles are then formed at the vertices by interconnecting each vertex with the adjoining two vertices in the same row and with at least one vertex in each of the two adjoining rows. These connections between vertices may be made by a framework of elongated structural elements joined at the vertices, or by structural panels connected together along lines corresponding to the longitudinal axes of such elements. In either case polyhedral angles are formed at the vertices which must be predetermined to calculate the resulting lateral angles between the framework elements or the inside angles of the panels.

In any regard, once the pattern of vertices is established so that the total number of vertices in the imaginary spheroid is known, the polyhedral angle for each vertex is calculated by the present invention. Essential to this calculation is an understanding that in accordance with the present invention, the sum of all of such polyhedral angles of the spheroid is 720° less than the product of 360° times the total number of vertices on the spheroid, i.e., the polyhedral angles are less than 360° each by an average amount equal to 720° divided by the total number of vertices. Expressed as a formula, for equal polyhedral angles the relationship is $$P = \frac{360(N-2)}{N}$$

where P equals each polyhedral angle and N equals the total number of vertices.

For example, if there are 54 vertices in the imaginary spheroid the polyhedral angles will average 346⅔° each, i.e., the polyhedral angles are less than 360° each by an average of 13⅓°. Carrying this example further, in the accompanying drawings are illustrated three different patterns all based on an imaginary spheroid with 54 vertices.

Figure 1:
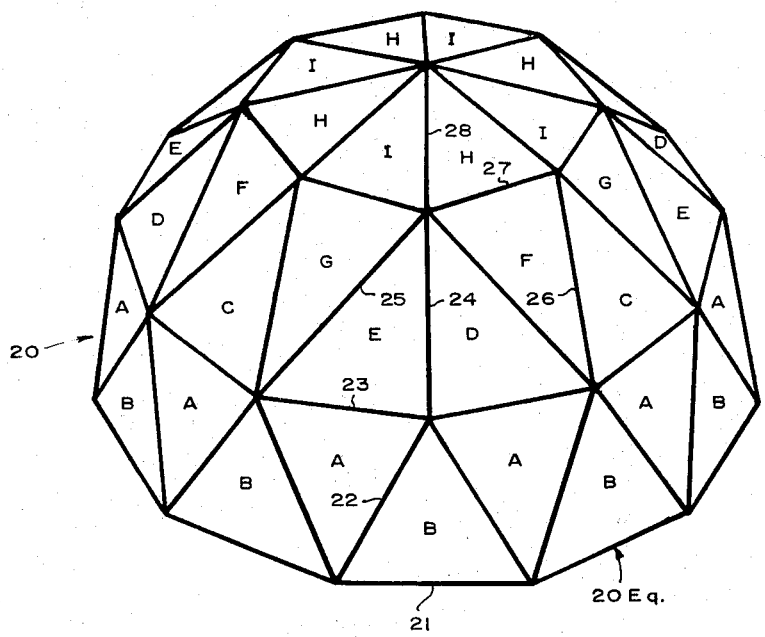
FIG. 1 is a perspective view illustrating a dome constructed in accordance with the present invention.

Commencing with FIG. 1, the domical structure 20 therein is semi-spheroidal, being based at the equator of an imaginary spheroid having seven azimuthal rows of vertices, starting with a single vertex at the zenith, then a row of eight equally spaced vertices, followed by three central rows of twelve vertices each, a sixth row duplicating the second row, and a seventh row consisting of a single vertex at the nadir. The vertices of the dome are interconnected outlining nine different triangles identified by A through I. Panels A and B are located between the bottom two rows of vertices and are each eight in number, while four panels H and four panels I join at the domical apex and are based on the second row of vertices. These top panels H and I are mirror images of one another, and the same is true of intermediate panels D and E, and F and G. Viewed in this light the dome 20 may be considered as having six different panels, and namely A, B, C, D–E, F–G, and E–I. In the alternative, if the connections between the vertices are by way of elongated structural elements, it will be noted that eight different lengths 21 through 28 are involved.

Figure 2:
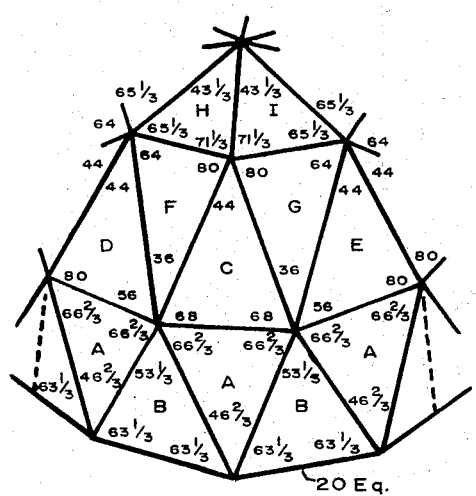
FIG. 2 is a schematic of a quadrant of the dome of FIG. 1 with respective angles indicated.

For purposes of example, in FIG. 1 the vertices in each row have been equally spaced apart and the polyhedral angles made equal. To illustrate the manner of calculating the angles of the triangles A through I, in FIG. 2 a quadrant of the dome 20 has been laid out schematically and the respective lateral angles of the polyhedral angles have been size marked. The manner of calculation of these angles will now be reviewed.

First, it will be recognized that triangles A, B, and C are desirably isosceles, and that the upper angles of triangles H and I should be equal, and namely 43⅓° each (one-eighth of the polyhedral angle of 346⅔°). If the dome 20 is to be fabricated from panels, best efficiency in use of materials may result from making triangles A and B close to the same size. To this end the isosceles angles of B and the lower angle of triangle A can be readily determined since the sum of the latter plus the pair of isoceles angles of triangle B must total one-half of the polyhedral angle of 346⅔°. The other angles of triangles A and B can then be readily determined since the sum of the angles in each triangle is 180°.

The adjoining lower angles of triangles D and E are equal, and hence each equal 80°, namely, one-half of the difference between 346⅔° and the sum of the upper angle of triangle B and a pair of the isosceles angles of triangle A. For appearance it is preferred to have azimuthal rows of vertices approximately equally spaced apart. To this end the altitudes of triangles C, D–E, and F–G are made approximate to that of triangles A and B by arbitrarily choosing 68° for the isosceles angles of C, and 36° for the lower angles of F and G. Once this choice is made, regardless of how made, the remaining angles of the triangles can be readily calculated.

Figure 3:
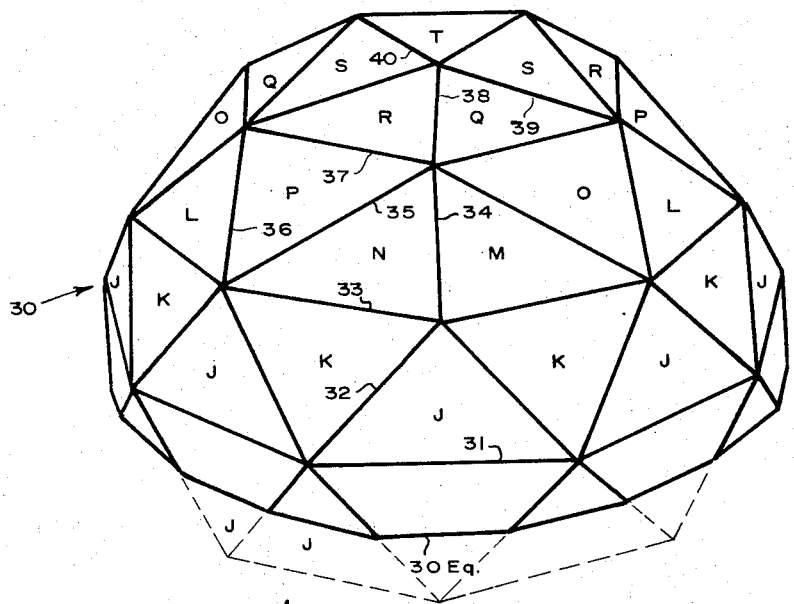
FIG. 3 is a perspective view showing a second dome embodying the invention.

Continuing to FIG. 3, the domical structure 30 illustrated therein is half of an imaginary spheroid still having fifty-four vertices as in the previous example, but arranged in eight azimuthal rows rather than seven, and having the zenith outlining an equilateral triangle T rather than being a single vertex. The spheroid from which the dome 30 is taken has as its top azimuthal row the three vertices of the triangle T, has six vertices units second azimuthal row followed by four rows of nine vertices each, and has its sixth and seventh row duplicating its second and first rows, respectively. The equator 30 Eq. is midway between the fourth and fifth rows and for purposes of example has been chosen as the base of the dome 30. As a result the panels adjoining the base of dome 30 are defined by cutting an equatorial row of isoceles triangles J at the midpoint of their altitudes, these triangles having been completed by broken lines in the drawing and being alternately inverted.

Figure 4:
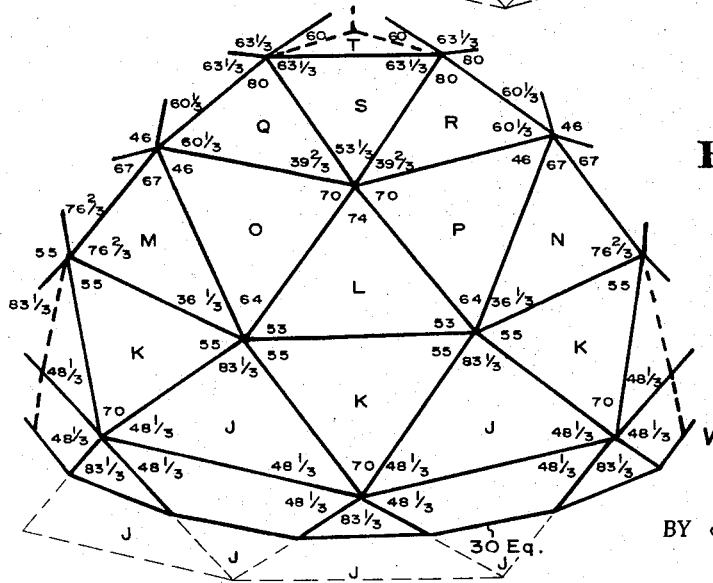
FIG. 4 is a layout of a third of the dome of FIG. 3.

In FIG. 4 a third of the dome 30 is shown schematically and the lateral angles of the polyhedral are marked as before. The angles for equatorial triangles J have been selected to give approximately equal spacing between the azimuthal rows of vertices. For economy triangle J has been repeated as alternate of the isoceles triangle K in the next row. The lower angles (70°) of triangles K are computed by subtracting from 346⅔° the known five adjoining lateral angles consisting of four isoceles angles and one non-isoceles angle of triangles J. Then the size of the isoceles angles (55°) of triangles K is apparent.

Between the second and third rows of azimuthal vertices there is defined three sets of triangles L, M–N, and O–P which are analogous to triangles C, D–E, and F–G of dome 20 in that M and N are mirror images of one another, and the same is true of triangles O and P. Next above, directly beneath axial equatorial triangle T, are three sets of triangles Q–R and S, triangles Q–R being mirror images of one another, and triangles S being isoceles and having its base common with triangle T. The angles of triangles L through S are selected as before to give approximately equal spacing between the azimuthal rows of vertices. In each instance the predetermination of 346⅔° for the sum of the lateral angles at each polyhedral vertex is maintained.

It will be apparent that the base of the dome 30 could have been set, for example, at the fifth row of azimuthal vertices rather than at the equator. This would give the advantage of more head room adjacent the base of the inside wall. In view of the mirror image relationship of triangles M–N, O–P, and Q–R, the dome 30 involves eight different panels. If connections between the vertices are by elongated structural elements, ten different lengths are required as indicated by 31 through 40.

Of importance is to understand that having the azimuthal rows of vertices of approximately equal spacing is merely a matter of visual preference in most cases. The spacing between rows can be varied at will within the teachings of the present invention.

Figure 5:
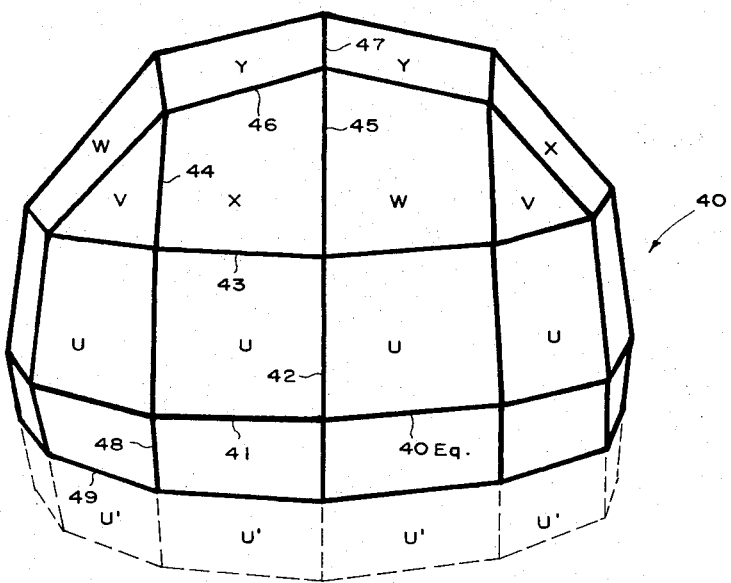
FIG. 5 is a perspective of a third dome embodying the invention.

In FIG. 5 there is illustrated a further dome 40 determined by this invention and provided to show a dome with primarily quadrilateral faces rather than triangular faces as in the previous two examples. Like the dome 20, for purposes of example, the imaginary spheroid from which the dome 40 is taken also has 54 vertices arranged in seven rows the first of which is a single vertex at the apex and the fourth of which is equatorial. The center three rows of vertices are exactly azimuthal, with twelve vertices in each, while the second and sixth rows zig-zag in a regular manner on both sides of respective azimuths. Such a zig-zagging row of vertices shall be considered as being an azimuthal row by definition in this description and accompanying claims.

Figure 6:
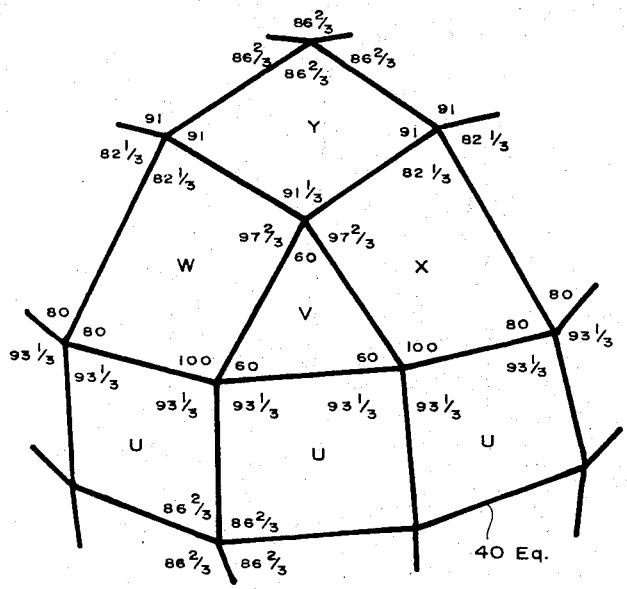
FIG. 6 is a layout of a quadrant of the dome of FIG. 5.

A quadrant of dome 40 is outlined in FIG. 6 together with the lateral angles of the polyhedral angles of the vertices. It will be noted that the quadrilaterals U between the third and fourth (equatorial) rows of vertices are congruent isoceles trapezoids and are surmounted by four sets of alternating equatorial triangles V and quadrilaterals W–X, the latter two being mirror images of one another. At the apex four congruent quadrilaterals Y are merged, and these are centered over the triangles V. For added head room the dome 40 is shown including half of the heighth of the equilaterals U' which correspond in the lower half of the spheroid to the equilaterals U.

The lower angles of trapezoids U and the apical angles of equilaterals Y are calculated by dividing 346⅔ by four thereby giving 86⅔°, and the upper angles of 93⅓° each for U are thereby determined in view of the fact that the sum of the angles in a quadrilateral is 360°. This makes the lower obtuse and acute angles of quadrilaterals W and X readily calculable, and namely by subtracting from 346⅔ the sum of 96⅓, 96⅓, and 60 to give 100° in the case of the obtuse angle, and by subtracting twice 93⅓ from 346⅔ and then dividing by two to give the acute angle of 80°.

The upper angles of panels W–X determine the amount of zig-zag in the second row of vertices in the dome 40. The greater the selected difference in these angles, the greater the zig-zag. Once selected the remaining angles of upper quadrilaterals Y is set. Proper angle selection can contribute to efficient use of materials in fabricating the dome.

In view of the mirror image relationship of panels W and X, the dome 40 only requires use of four different shapes of panels if based on the equator 40 Eq., and a fifth (½ of U') when based as shown beneath the equator. If elongated structural elements are used only seven different lengths 41 through 47 are needed to the equator, and two additional 48–49 if based as shown.

Figure 7:
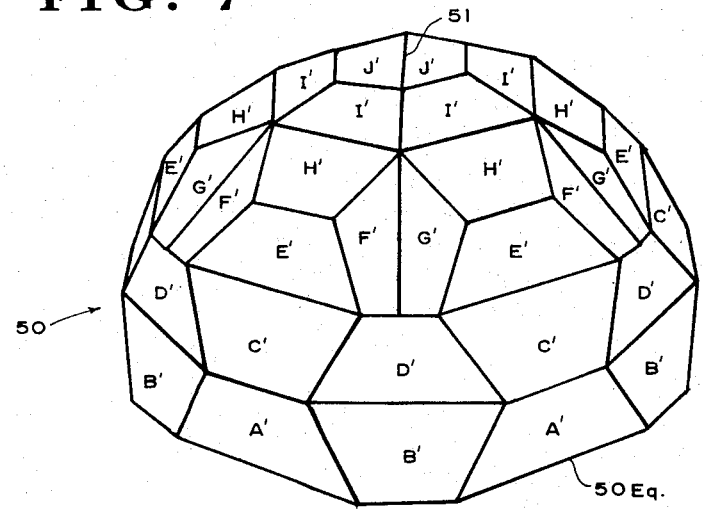
FIG. 7 is a perspective view of a fourth dome in accordance with the invention.
Figure 8:
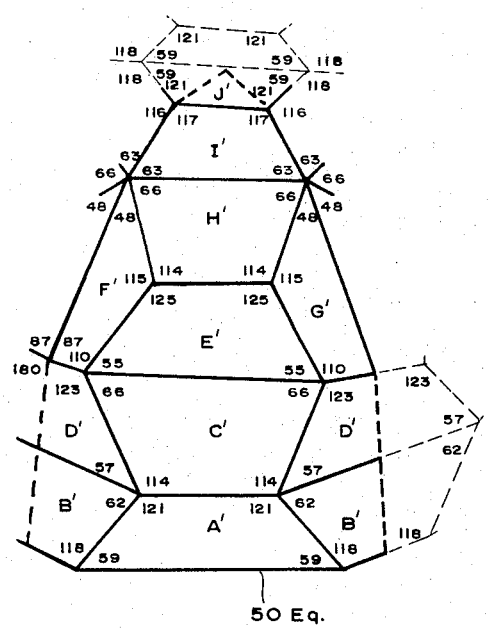
FIG. 8 is a layout of one-sixth of the dome of FIG. 7.

FIG. 7 illustrates a further example of a dome 50 comprising half of an imaginary spheroid having eleven azimuthal rows of vertices connected to give a pattern of quadrilateral faces A' and J'. The apex of the dome comprises a line 51 and the base is at the equator 50 Eq. Rows three, five, six, seven, and nine of the spheroid each have twelve vertices, the top two and bottom two rows each have six vertices, and rows four and eight each have eighteen vertices, giving a total of 120 polyhedral vertices. Applying the formula $$P = \frac{360(N-2)}{N}$$

it is found that each polyhedral angle is 354°. With this known, the angles of the quadrilateral can be selected and calculated in similar manner to that already described for domes 20, 30 and 40. These angles are indicated in FIG. 8 which is the layout of one-sixth of the dome 50.

Figure 9:
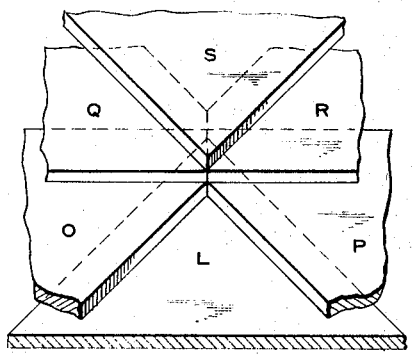
FIGS. 9 through 16 are perspective detail views showing examples of various types of possible joints and connections which may be used on domical structures embodying the present invention.
Figure 10:
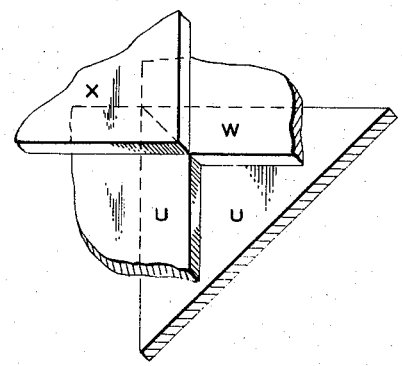
Figure 11:
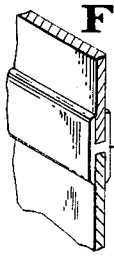
Figure 12:
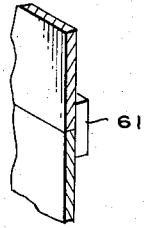
Figure 13:
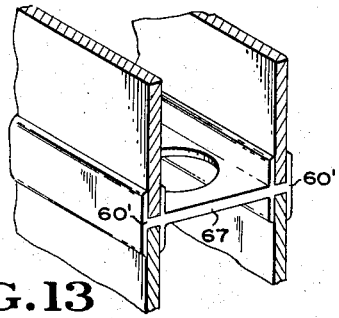
Figure 14:
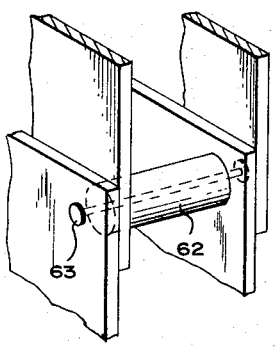
Figure 15:
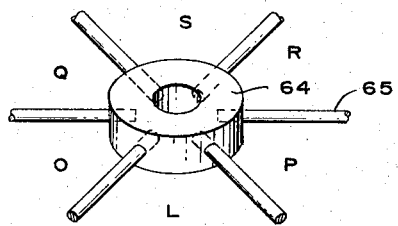

As has been previously indicated, the vertices of the domes may be formed by panels, or may be interconnected by elongated structural elements and the resulting framework covered as by plastic or canvas fabric. If panels are used, as for example, plywood sheets, such may be overlapped in multiple at the joints. Typical such lap joints are illustrated in FIGS. 9 and 10 for the intersection of the indicated lettered panels from domes 30 and 40, respectively. The lapped portions may be bonded together by a suitable adhesive or secured by screws or other fastening devices. Instead of lap joints the panels may be interconnected by channel beads 60, or secured to backing strips 61, as shown in FIGS. 11 and 12. If desired the panels can be double-walled, the walls being spaced as by a web 67 between channel beads 60' (FIG. 13), or by spacing sleeves 62 on the tie bolts 63 (FIG. 14).

Figure 16:
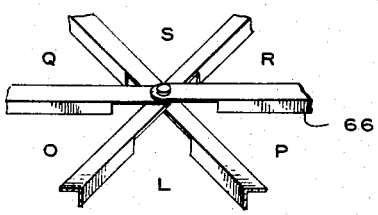

For a framework of tubes or bars, the vertex ring 64 preformed with sockets for rods or tubes 65 arranged at the proper angles can be used in a manner similar to Tinker toys. Such has been shown in FIG. 14 for the same joint as in FIG. 9. In FIG. 16 is shown angle bars 66 overlapped at their ends and connected by a pin 67 at the vertex. Various other constructions well known in the building arts may be used for the panels or structural elements without departing from the teachings of the present invention.

In the examples above described, for ease and clarity of illustration the domes have been shown with relatively few azimuthal rows of vertices. The number of these rows would be increased considerably for large domical structures. Suitable door and window openings can be provided on the panels or covering, and lighting can be enhanced by use of transluscent panels.

It is thought that the invention will have been clearly understood from the foregoing detailed description. Changes in the details of construction will suggest themselves and may be resorted to without departing from the spirit of the invention, wherefore it is my intention that no limitations be implied and that the hereto annexed claims be given a scope fully commensurate with the broadest interpretation to which the employed language admits.

What I claim is:

1. A domical structure having a plurality of vertices occupying points on the surface of an imaginary spheroid having its zenith at the apex of the domical structure, said spheroid having at least seven generally azimuthal rows of polyhedral vertices on its surface arranged symmetrically relative to its equator, consecutive of said rows commencing at said zenith including all of said plurality of vertices of the domical structure, about half of said rows lying in the 90° of latitude centered on said equator and each such central row having the same number of vertices, the polyhedral vertices in each said row each being encompassed by a respective polyhedral angle for the row, the sum of all of such polyhedral angles of the spheroid being 720 degrees less than the product of 360 degrees times the sum of the polyhedral vertices of said spheroid, and means interconnecting said plurality of vertices.

2. The domical structure of claim 1 in which all of the polyhedral angles of the spheroid are equal.

3. The domical structure of claim 1 in which the azimuthal rows of vertices which are nearer to said apex each have less vertices than in each said central row.

4. The domical structure of claim 1 in which each of said azimuthal rows of vertices has all of its polyhedral angles equal to one another.

5. The domical structure of claim 3 in which alternate of the azimuth rows of vertices in said equatorial segment have their vertices occupying the same meridians of the spheroid.

6. The domical structure of claim 1 in which said means interconnecting said plurality of vertices comprises a plurality of elongated members intersecting at the vertices, and a covering carried by said elongated members.

7. The domical structure of claim 1 in which said means interconnecting said plurality of vertices comprises a plurality of panels intersecting at the vertices and along lines intersecting at the vertices.

References Cited

UNITED STATES PATENTS

| | | | |
|---|---|---|---|
| 1,970,404 | 8/1934 | Tesch | 52—81 |
| 3,137,371 | 6/1964 | Nye | 52—81 |
| 3,296,755 | 1/1967 | Chisholm | 52—81 |

JOHN E. MURTAGH, *Primary Examiner.*